(12) United States Patent
Baker et al.

(10) Patent No.: US 9,438,817 B1
(45) Date of Patent: Sep. 6, 2016

(54) PHOTOGRAPHY STUDIO ARRANGEMENT

(71) Applicant: Amazon Technologies, Inc., Seattle, WA (US)

(72) Inventors: Joseph Baker, Nashville, TN (US); Olivier S. Renck, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/672,818

(22) Filed: Mar. 30, 2015

(51) Int. Cl.
*G03B 15/07* (2006.01)
*H04N 5/262* (2006.01)
*H04N 5/247* (2006.01)
*H04N 5/235* (2006.01)
*H04N 5/225* (2006.01)

(52) U.S. Cl.
CPC ............ *H04N 5/2621* (2013.01); *G03B 15/07* (2013.01); *H04N 5/2256* (2013.01); *H04N 5/2352* (2013.01); *H04N 5/247* (2013.01)

(58) Field of Classification Search
CPC ................................ G03B 15/06; G03B 15/07
See application file for complete search history.

(56) References Cited

U.S. PATENT DOCUMENTS

| 1,015,292 | A | * | 1/1912 | Calhoun | G03B 15/06 396/1 |
| 4,236,795 | A | * | 12/1980 | Kephart | G03B 15/06 396/3 |
| 6,106,124 | A | * | 8/2000 | Tarsia | G03B 15/06 362/11 |
| 7,177,537 | B1 | * | 2/2007 | Adolphi | G03B 17/53 362/11 |
| 8,676,045 | B1 | * | 3/2014 | Sawatzky | G03B 15/07 396/3 |
| 2002/0127008 | A1 | * | 9/2002 | Saigo | G03B 15/06 396/1 |
| 2007/0014563 | A1 | * | 1/2007 | Ferro | F21V 11/06 396/199 |

* cited by examiner

*Primary Examiner* — W B Perkey
(74) *Attorney, Agent, or Firm* — Thomas | Horstemeyer, LLP

(57) ABSTRACT

Disclosed are various embodiments of a studio arrangement and a method of capturing images and/or video. One embodiment of the disclosure includes a key light source aimed at a subject, and an image capture position that includes an image capture device aimed at the subject. The subject is placed on an elevated platform. The background behind the elevated platform is a reflective material. The studio arrangement achieves a desired effect of a white background where a rear edge of the elevated platform is imperceptible to the image capture device positioned at the image capture position.

20 Claims, 6 Drawing Sheets

PHOTOGRAPHY STUDIO ARRANGEMENT

BACKGROUND

Items are often photographed and/or filmed in a studio environment and the resultant images and/or video rendered on a display device associated with a computing device. The resultant images and/or video can also be used as promotional and/or informational collateral associated with the items, which are also viewed on a display device. For example, a model can be photographed wearing certain articles of clothing or accessories for the purposes of capturing imagery and video that can be used in a catalog or an electronic commerce site listing or detail page.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the disclosure are directed to an arrangement of various elements to form a studio in which items, people, products, clothing, or any other objects can be photographed and/or filmed to achieve a particular effect. More specifically, embodiments of the disclosure can allow images and/or video of an item placed in a studio arrangement as described herein to be captured with a background that appears, when captured with an image capture device, as a white background. In other words, images and video of items captured in the studio arrangement appear against a background that is equivalent or substantially equivalent to a white background when converted into a web color hexadecimal triplet corresponding to a true white. A hexadecimal triplet corresponding to a true white according to various browser standards, such as hypertext markup language (HTML), cascading style sheets (CSS), and other standards, can be represented by three bytes corresponding to a red parameter, a green parameter, and a blue parameter, each with a maximum value of 255. Additionally, embodiments of the disclosure also achieve an effect of an object photographed and/or filmed in the studio arrangement with at least a partial reflection of the object appearing beneath the object.

Other solutions for achieving such a result for capturing images and/or video of objects set against a true white background include solutions that often involve some type of image retouching, post processing, "green screen" techniques, or other special effects and image and video manipulation to achieve the result of an object set against a white background with a reflection of the object appearing beneath the object. Additionally, other solutions may require an extensive studio arrangement involving lighting that is positioned behind and/or laterally offset from a model positioned on a stage, which requires a sizeable studio in which to construct such an arrangement. Accordingly, as will be described herein, embodiments of the present disclosure provide a studio arrangement in which an object can be photographed and/or filmed, and the images and/or video captured by the camera achieve the effect noted above.

Figure 1:
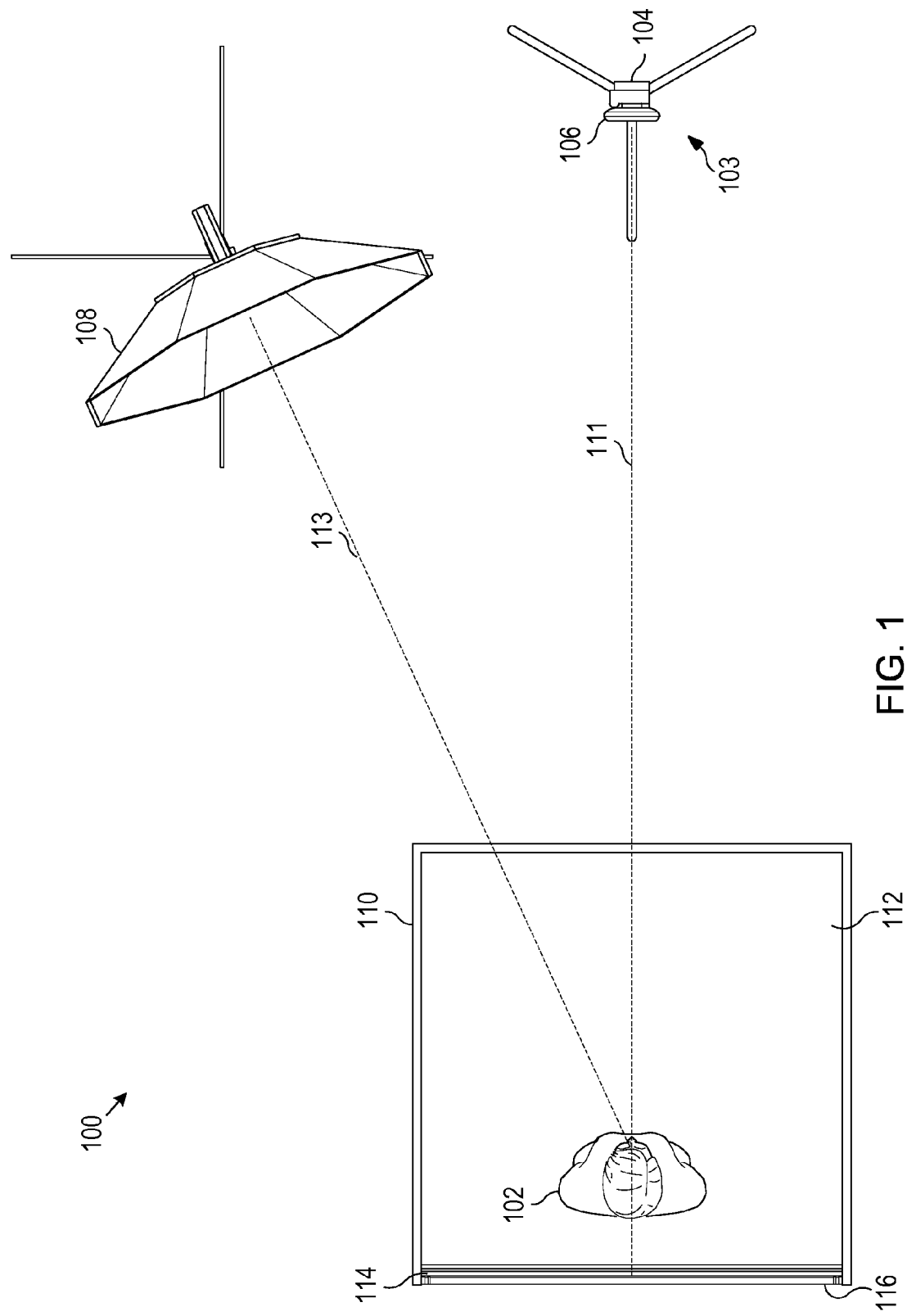
FIG. 1 is a top view of a studio arrangement according to various embodiments of the present disclosure.
Figure 2:
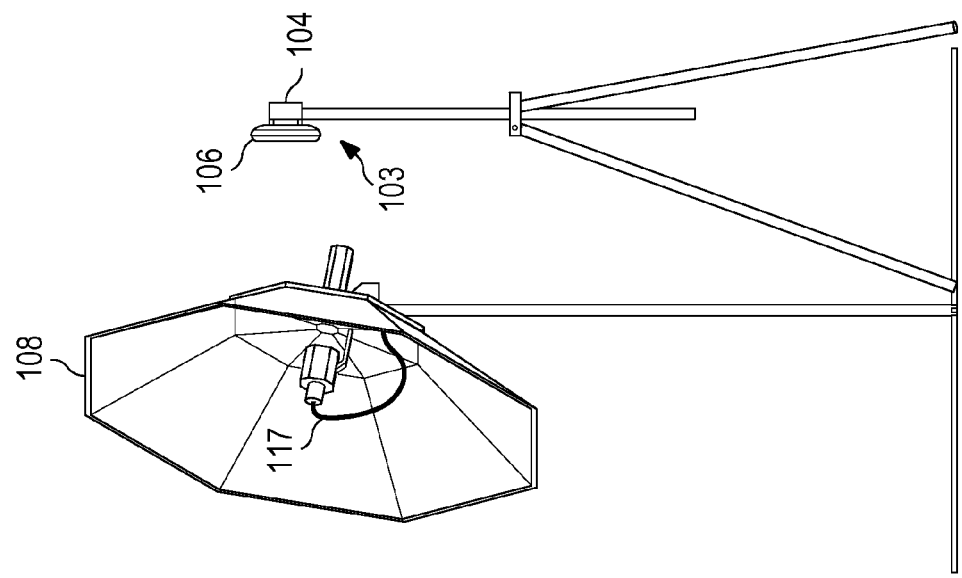
FIG. 2 is a side view of the studio arrangement of FIG. 1 according to various embodiments of the present disclosure.
Figure 2:
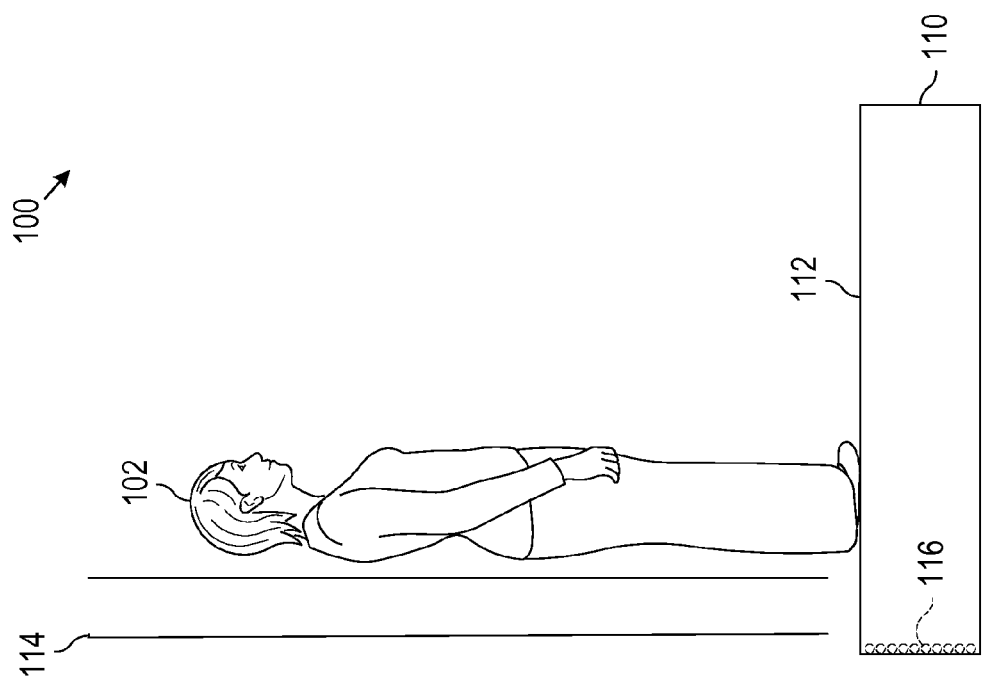

With reference to FIGS. 1-2, shown is a studio arrangement 100 according to various embodiments. FIG. 1 illustrates a top plan view of a studio arrangement 100 according to an embodiment of the disclosure, and FIG. 2 illustrates a side view of the studio arrangement 100. As shown in FIG. 1, the studio arrangement 100 also includes an elevated platform 110 on which a subject 102 can be positioned and be photographed and/or filmed in front of a background 114. A subject 102 can comprise a model, product, or any object desired to be photographed and/or filmed in the studio arrangement 100 as appearing on a true white background.

In one embodiment, the subject 102 can be placed approximately eighteen inches in front of the background 114. The elevated platform 110 is configured with a top surface 112 made of a material that can include, but is not limited to a plastic, such as Poly(methyl methacrylate), which can be a safety glass, an acrylic glass, a laminated glass and/or any other materials that possess a degree of transparency as well as reflectivity. The material from which the top surface 112 is constructed can also possess a degree of shatter resistance or break resistance such that it can support the weight of the subject 102. Such a material also produces an effect in images and/or video of the subject 102 such that a reflection of the subject 102 appears beneath the subject 102, but where the top surface 112 of the elevated platform 110 blends seamlessly into a white background. In one embodiment, the top surface 112 is a transparent surface. Such a glass is referred to herein as a safety glass, although any other material possessing similar properties can be employed.

The background 114 can include a reflective or electroluminescent material, such as a reflective fabric that reflects light directed at the reflective material. In one example, the reflective material can include a 3M SCOTCHLITE Reflective Material identified by product number 8910. The reflective material can comprise a silver fabric made from 65% polyester and 35% cotton and that reflects light directed toward the material. In an example of a light source that emits light perpendicularly toward the reflective material, the reflective material reflects or returns light back towards the light source. The reflective material can also appear, when illuminated by a light source and when photographed or filmed by a camera or image capture device, white in color.

Additionally, light reflecting off the background 114, from a rear light source 116 and into an image capture device 104 positioned in an image capture position 103 in the studio arrangement 100 causes the top surface 112 of the elevated platform 110 to also appear white in color. Also, a rear edge of the elevated platform also appears imperceptible or not visible to the image capture device due to the positioning, configuration, and orientation of the various elements in the studio arrangement 100. It should be appreciated that a background 114 that reflects different colors of light may be chosen. Due to the positioning of the various elements in the studio arrangement 100, light emanating from the background 114 and the rear light source 116 causes the top surface of the elevated platform 110 to appear the same color as the light reflected by reflective material comprising the background 114.

The elevated platform 110 can be positioned adjacent to the background 114 in a longitudinal axis 111 that intersects the elevated platform 110 and the background 114. In some embodiments, a rear surface of the elevated platform 110 can be positioned such that it touches the background 114. In other embodiments, the rear surface of the elevated platform can be positioned such that it is near or adjacent to the background 114. In some embodiments, the top surface 112 of the elevated platform 110 can be configured as an approximately four feet by four feet square. In other embodiments, a top surface 112 of a different size can be chosen, which can vary the size of a reflection of a subject 102 photographed on the elevated platform 110 that appears underneath the subject 102.

In one embodiment, the top surface 112 of the elevated platform 110 is also elevated approximately eleven inches above the floor of the studio arrangement 100. The height of the elevated platform 110 can also be varied to change the appearance of a reflection appearing underneath the subject 102 when the subject 102 is photographed by the image capture device 104.

The elevated platform 110 is also configured with a rear light source 116 or rear lighting that is positioned on or near a rear surface of the elevated platform 110 adjacent to the background 114. The rear light source 116, when activated, facilitates a white appearance of the top surface 112 of the elevated platform 110 when an image or video is captured using the image capture device 104. The rear light source 116 illuminates the rear surface as well as the top surface 112 of the elevated platform in order to facilitate a white appearance of the top surface 112 to the image capture device 104. The rear light source 116 can include an array of light emitting diodes (LEDs) affixed to the rear surface of the elevated platform 110 that is configured to illuminate the rear surface of the elevated platform 110. For example, the rear light source 116 can include a series of tube lighting affixed to the rear surface with a dimming capability so that exposure with respect to the image capture device 104 can be adjusted. As one example, the rear light source 116 can include ten tube lights that are forty watt incandescent equivalent in terms of light output.

The image capture position 103 is positioned in the longitudinal axis 111 intersecting the elevated platform as well as the background 114. As depicted in FIG. 2, the image capture position 103 includes an image capture device 104 that is aimed at the elevated platform 110 and background 114. The image capture device 104 can comprise a single-lens reflex (SLR) camera or any other type of camera or video camera. The image capture device 104 is also equipped with a ring flash 106 that is aimed at the elevated platform 110 and background 114. The ring flash 106 comprises a circular flash that is positioned around a lens of the image capture device 104.

The studio arrangement also includes a key light 108 that is aimed at the elevated platform 110 and background 114. The key light 108 is placed outside of the longitudinal axis 111 and configured to illuminate the subject 102 when activated. In one embodiment, the key light 108 is placed approximately five to six feet offset from the image capture position 103 at a distance in the axis 113 of approximately twelve to thirteen feet from the subject 102. However, the positioning of the key light 108 can vary as long as its intensity and positioned are configured with a light meter as described below.

The rear light source 116, key light 108 and ring flash 106 can also be configured to be in wired or wireless communication with the image capture device 104 such that they are illuminated or activated when a shutter of the image capture device 104 is also opened or activated. The key light 108 can comprise an octabank light, a soft box, an umbrella light, or any other photographic lighting device that can be aimed at and illuminate the subject 102. The key light 108 can include a light 117 that is aimed at a dispersal device, such as an umbrella or octabank such that the subject 102 is illuminated in an image or video captured by the image capture device 104 at the image capture position 103.

In one embodiment, to achieve a desired effect of a subject 102 photographed against a white background where a floor underneath the subject the image capture device 104 can configured with an International Standards Organization (ISO) film speed setting or sensitivity of 500, a shutter speed of approximately 160th of a second and a focal ratio or aperture setting, known as an f-number, of f/11, where "f" is a focal length or related to an aperture of a lens associated with the image capture device. The image capture device 104 can also be configured to capture imagery or video using a RAW capture mode. The intensity and positioning of the key light 108 and the intensity of the ring flash 106 can be configured with a photographic light meter based upon the image capture device 104 settings as described below.

The key light 108 can be adjusted using a light meter in which the light meter is provided with two of a possible three exposure setting inputs (e.g., ISO, shutter speed, and focal ratio or aperture setting) and calculates a third. In one embodiment, the key light 108 can be positioned and its intensity adjusted such that when a light meter is positioned at the subject 102 or the subject's desired position on the elevated platform 110 and is provided with inputs of an ISO sensitivity of 500 and a shutter speed of 160th of a second, the light meter returns a recommended f-number of approximately f/13.

The ring flash 106 is configured with the image capture position 103 at approximately twelve feet from a desired position of the subject 102. In one embodiment, the ring flash 106 can be adjusted in intensity such that when a light meter is positioned at the subject 102 or the subject's desired position on the elevated platform 110 and is provided with inputs of an ISO sensitivity of 500 and a shutter speed of 160th of a second, the light meter returns a recommended f-number in the range of approximately f/0.7-f/0.8.

The rear light source 116 is configured using a photographic light meter that is positioned against or adjacent to the top surface 112 of the elevated platform 110. The light meter can be aimed toward a rear surface of the elevated platform 110 while positioned approximately one foot from the background 114. In one embodiment, the rear light source 116 can be adjusted in intensity such that when a light meter is positioned as described above and is provided with inputs of an ISO sensitivity of 500 and a shutter speed of 160th of a second, the light meter returns a recommended f-number in the range of approximately f/9-f/10. In some embodiments, the rear light source 116 can be activated only during image capture or left in an activated state during use of the studio arrangement 100.

Correct configuration and calibration of the ring flash 106 and key light 108, when activated, can also be determined and/or verified with a grey card upon configuring both lights with a light meter. The ring flash 106 and key light 108, when activated, also cause a grey card positioned at the desired position of the subject 102 to yield, in an RGB color space, a hexadecimal triplet corresponding to a red parameter, a green parameter, and a blue parameter, each with a value in a range of approximately 183-187. The ring flash 106 and key light 108 as well as a camera's exposure settings can be adjusted to achieve such a grey card reading.

The ring flash 106, key light 108 and rear light source 116 can be configured independently of one another with a light meter. That is to say that the ring flash 106 is configured with the key light 108 and rear light source 116 deactivated. Similarly, the key light 108 is configured with the ring flash 106 and rear light source 116 deactivated and the rear light source 116 configured with the ring flash 106 and key light 108 deactivated.

Upon configuration of the lighting and the image capture device 104, imagery captured by the image capture device 104 achieve the effect of a pure white background, or an RGB triplet of approximately 255, as well as a pure white floor even though the top surface 112 of the elevated platform is transparent. Additionally, a reflection of the subject 102 also appears beneath the subject on the top surface 112 of the elevated platform.

As noted above, the image capture position 103 is the location in the studio arrangement 100 where an image capture device 104 can be positioned for image and/or video capture such that the desired effect described above is realized. Upon configuration of the lighting, the image capture position 103 can vary in the longitudinal axis 111 in its distance from the elevated platform 110. In some embodiments, the image capture position 103 can vary in distance from the elevated platform 110 in the range of approximately seven feet to eighteen feet with the desired effect described above still being achievable in imagery or video captured by the image capture device 104.

Figure 3A:
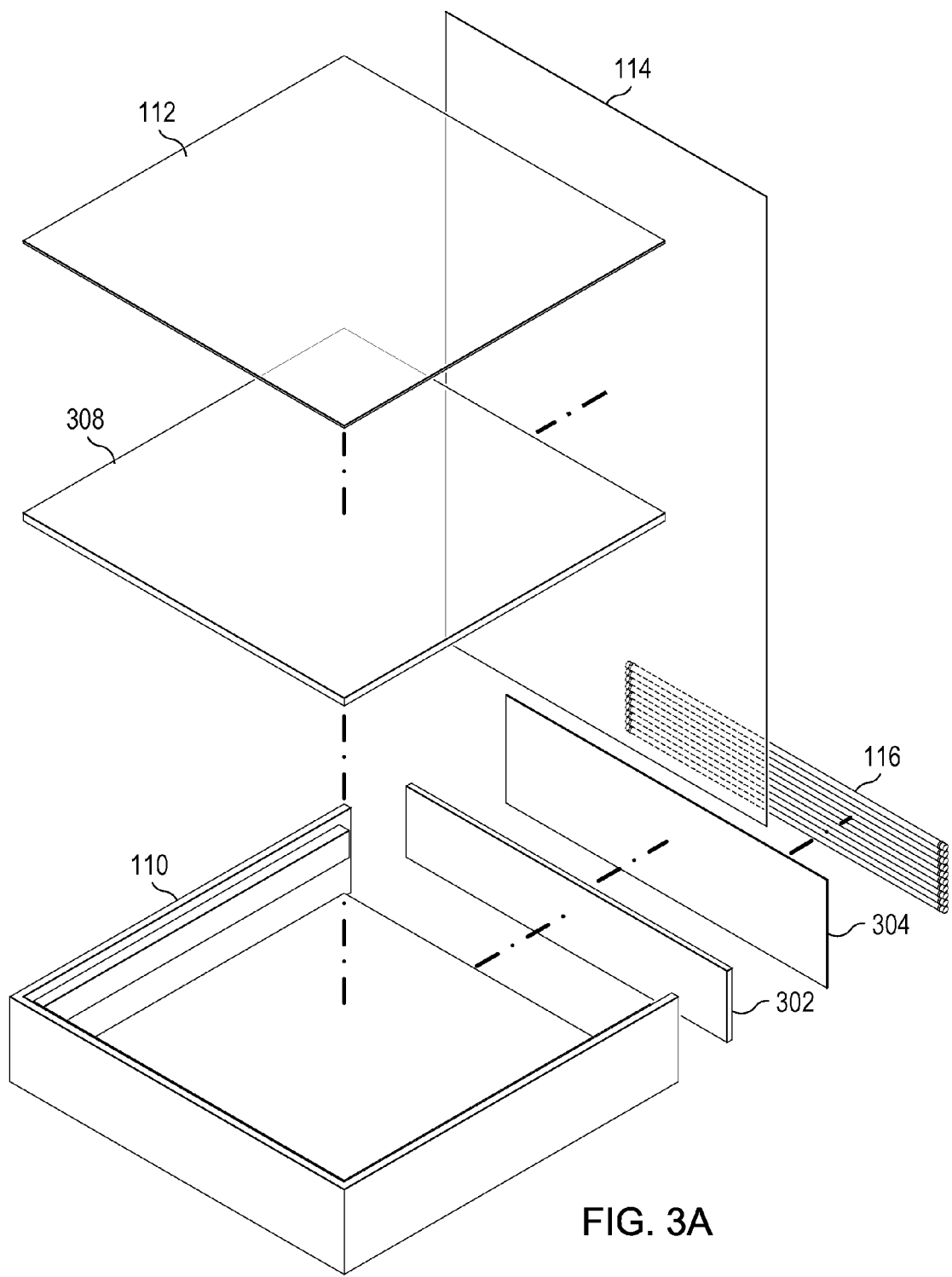
FIG. 3A is an exploded view of an elevated platform in a studio arrangement according to various embodiments of the present disclosure.
Figure 3B:
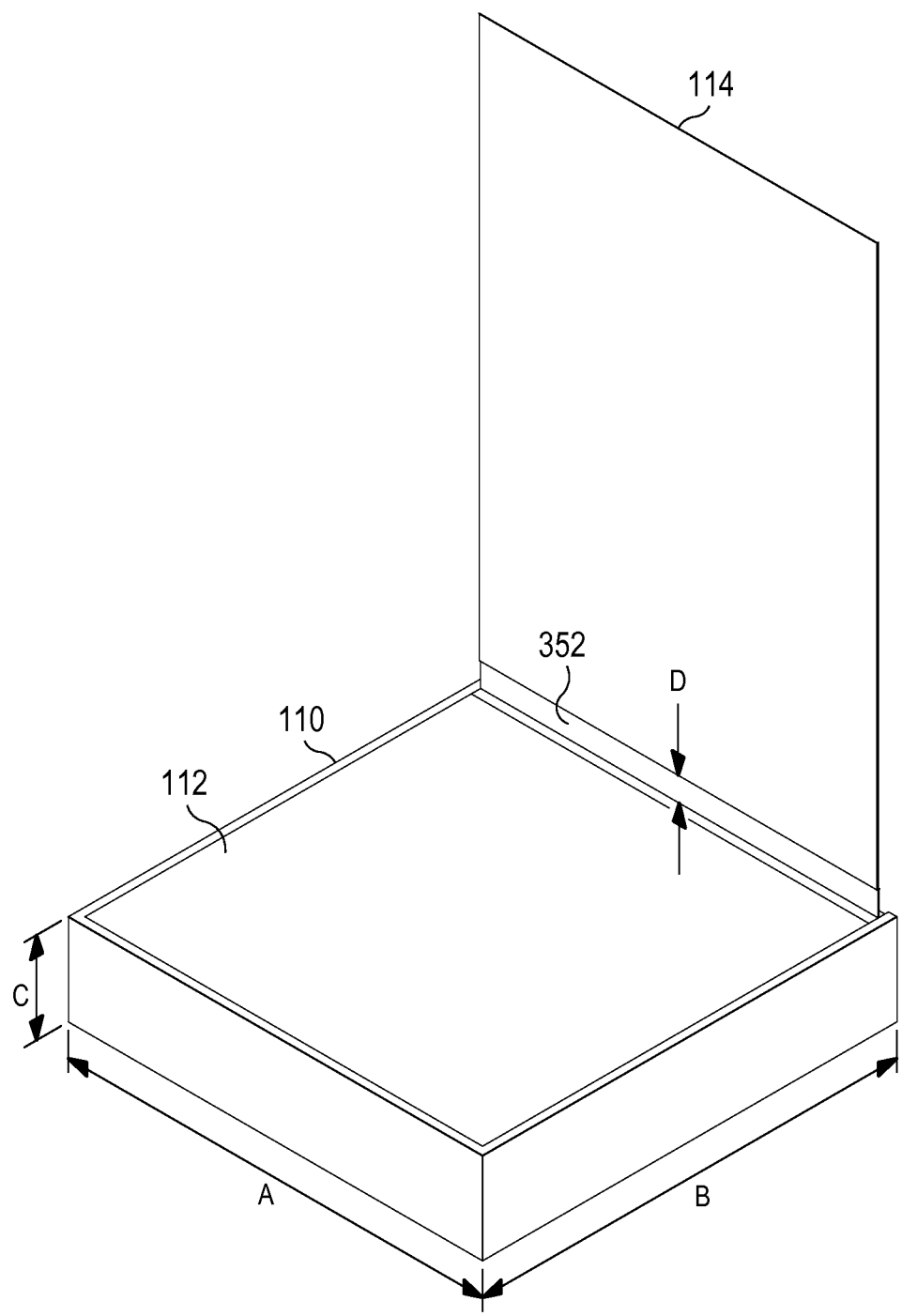
FIG. 3B is an unexploded view of an elevated platform in a studio arrangement according to various embodiments of the present disclosure.

Referring next to FIGS. 3A-3C, additional detail with respect to the elevated platform 110 and background 114 are presented. FIG. 3A depicts an exploded view of the elevated platform 110 and background according to one embodiment of the disclosure. As shown in the FIG. 3A, the elevated platform 110 includes a rear surface that is constructed from various components. A transparent panel 302 that can be constructed from safety glass can provide a base from which a rear surface of the elevated platform 110 is constructed. Additionally, a white panel 304 that can be constructed from white colored safety glass can be sandwiched between the transparent panel 302 and the rear light source 116 that is also mounted to the rear surface. When the rear light source 116 is activated, the white panel 304 and transparent panel 302 are illuminated so that they appear pure white in imagery or video captured by the image capture device 104. In some embodiments, the rear surface of the elevated platform 110 can be constructed from a single white panel 304 to which the rear light source 116 is mounted rather than from a transparent panel 302 and a white panel 304.

Additionally, in some embodiments, the top surface 112, when constructed from clear or transparent safety glass, can be supported by one or more additional transparent panels 308 that can also be constructed from a transparent safety glass or any other transparent material to support the weight of a subject 102 standing atop the elevated platform 110. Additionally, as noted above, the background 114 can be constructed from a reflective or electroluminescent fabric that, when illuminated by a light source, appears white when photographed by the image capture device 104.

Referring next to FIG. 3B, shown is an unexploded or assembled view of the elevated platform 110 and background 114 according to one embodiment of the disclosure. As shown in FIG. 3B, the elevated platform 110 is adjacent to or touching the background 114. In the example shown, dimension A is approximately four feet and dimension B is also approximately four feet. Dimension C, or the height of the elevated platform 110, is approximately eleven inches.

As also shown in FIG. 3B, the background 114 can be positioned such that a gap 352 is formed between the bottom of the background 114 and the top surface 112 of the elevated platform 110. In one scenario, the gap 352 is a vertical gap that is formed to facilitate the desired effect of a white background and a white floor in imagery captured by the image capture device 104 with little or no perceptible transition between the background and floor. Dimension D, which characterizes the gap 352, is approximately three inches in one scenario.

Figure 4:
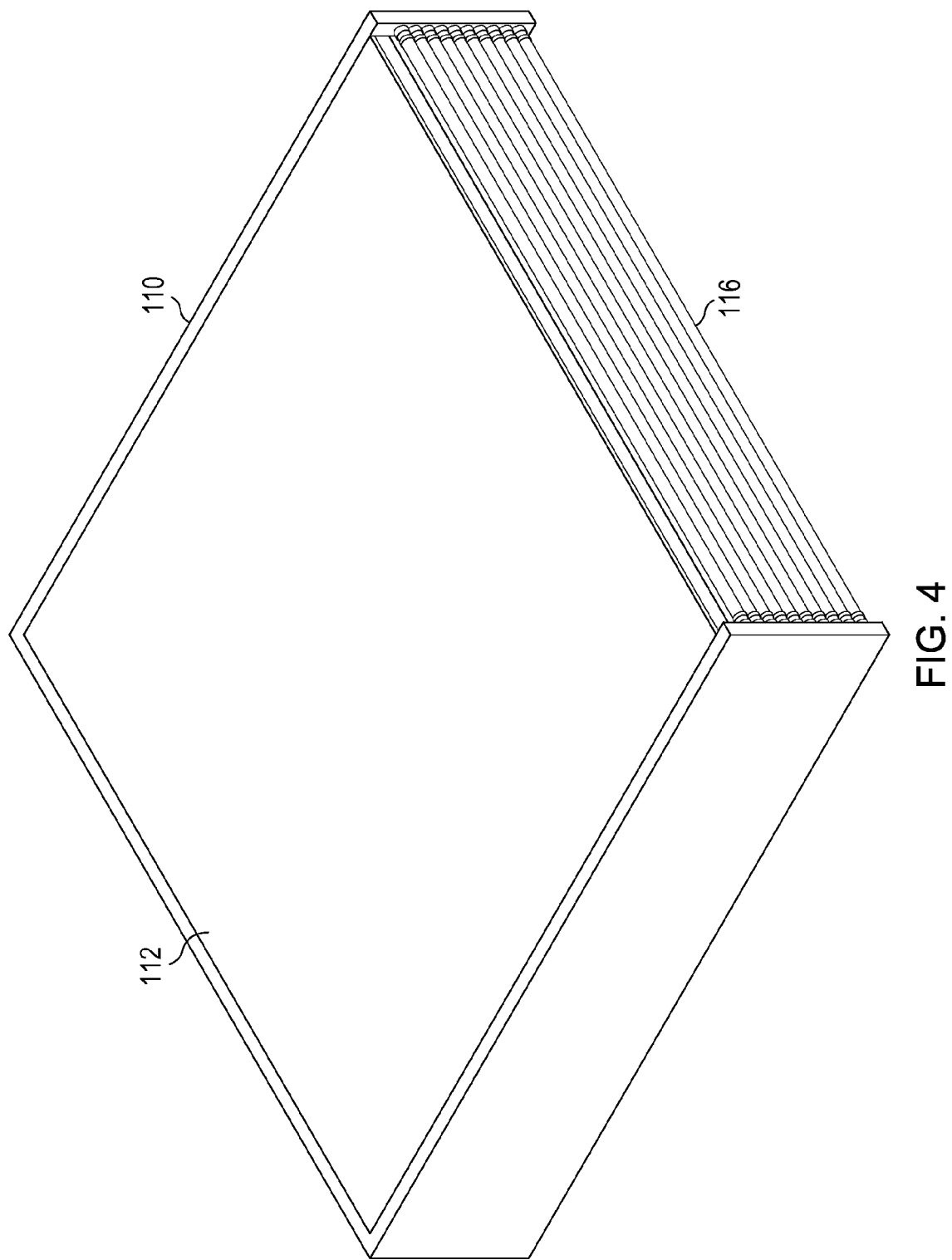
FIG. 4 is an alternative angle of an elevated platform in a studio arrangement according to various embodiments of the present disclosure.

Referring next to FIG. 4, also shown is an unexploded or assembled view of the elevated platform 110 from an alternate angle such that a rear surface of the elevated platform 110 is shown. As shown in FIG. 4, the rear light source 116 is mounted to a rear surface of the elevated platform 110 such that the white panel 304 and transparent panel 302 on a rear side of the elevated platform are illuminated. As noted above, the rear light source 116 can comprise an array of LEDs lights, fluorescent lighting, strobe lighting, tungsten lighting, or any other type of lighting that is configured using a photographic light meter as described in the discussion of FIGS. 1-2.

In operation, the ring flash 106 and rear light source 116 combine to produce an effect in which the subject 102 appears on a white background upon a white surface when an image or video is captured by the image capture device 104. The ring flash 106 causes light to reflect off the background 114, causing the reflective material from which the background 114 is constructed to illuminate or appear white in color to the image capture device 104. The rear light source 116 illuminates the rear surface of the elevated platform 110 as well as the top surface 112, owing to the configuration of the rear surface from a white panel 304 and a transparent panel 302 through which light may pass. While the rear light source 116 and ring flash 106 create the effect of the white background and a white surface on which a subject 102 may be positioned, the key light 113 illuminates the subject 102.

Figure 5:
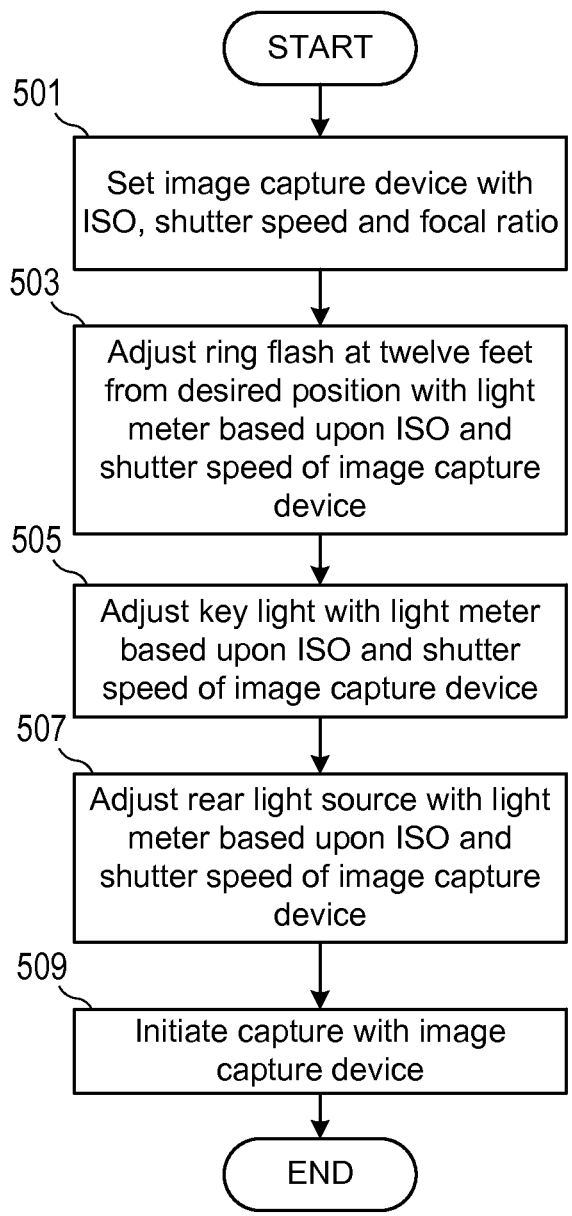
FIG. 5 is a flowchart illustrating a method of capturing an image in the studio arrangement of FIGS. 1-2 according to various embodiments of the present disclosure.

Referring next to FIG. 5, shown is a flowchart that provides one example of a method of using the studio arrangement 100 (FIG. 1) according to various embodiments. It is understood that the flowchart of FIG. 5 provides merely an example of the various ways in which a studio arrangement 100 according to the present disclosure can be employed to capture images and/or video of a subject 102 (FIG. 1) to achieve the desired effect described above.

At box 501, a user of a studio arrangement 100 according to embodiments of the disclosure can set the ISO sensitivity, shutter speed, and aperture setting, or f-number, of an image capture device. In one embodiment, an ISO sensitivity of 500 can be selected as well as a shutter speed of approximately 160th of a second. An aperture setting, or f-number, of f/11 can be selected for the image capture device 104.

At box 503, the intensity or power of the ring flash 106 can be adjusted with a light meter positioned at the desired position of the subject 102 based upon the ISO sensitivity and shutter speed selected for the image capture device 104.

The ring flash 106 is positioned at twelve feet from the desired position of the subject 102 in order to adjust the intensity of power of the ring flash 106. In one embodiment, an ISO sensitivity of 500 and shutter speed of 160th of a second can be provided as inputs to a light meter. The ring flash 106 can be adjusted in intensity or power until the light meter returns a recommended aperture setting in the range of f/0.7-f/0.8.

At box 505, the intensity or power of the key light 108 can be adjusted with a light meter placed at the desired position of the subject 102 on the elevated platform 110 based upon the ISO sensitivity and shutter speed selected for the image capture device 104. In one embodiment, an ISO sensitivity of 500 and shutter speed of 160th of a second can be provided as inputs to a light meter. The key light 108 can be adjusted in intensity or power until the light meter returns a recommended aperture setting of approximately f/13.

At box 507, the intensity or power of the rear light source 116 can be adjusted with a light meter based upon the ISO sensitivity and shutter speed selected for the image capture device 104. The light meter can be aimed toward the white surface 304 of the elevated platform through the top surface 112 while positioned approximately one foot from the background 114. In one embodiment, an ISO sensitivity of 500 and shutter speed of 160th of a second can be provided as inputs to a light meter. The rear light source 116 can be adjusted in intensity or power until the light meter returns a recommended aperture setting in the range of f/9-f/10. At box 509, image capture of imagery or video can be initiated at the image capture device 104, which can cause the ring flash 106, key light 108 and rear light source 116 to be activated. Resultant images or video captured by the image capture device 104 using the studio arrangement as described can achieve the desired effect. Thereafter, the process can proceed to completion.

Examples of the disclosure can allow images and/or video of the subject 102 to be captured with a background and floor that appears, when captured with an image capture device 104, as a near perfect white while limiting the need for post-processing, retouching, or other image manipulation to achieve such an effect. In other words, images and video of items captured in the studio arrangement 100 appear against a background and floor that appears white in color while limiting the when converted into a web color hexadecimal triplet corresponding to a true white. The desired result can be achieved without extensive image retouching, post processing, "green screen" techniques, or other special effects and image and video manipulation to achieve the result of the subject 102 set against a true white background and floor.

It should be noted that angles, dimensions, distances, settings, parameters, and other numerical data may or may not be expressed herein in a range format. It is to be understood that the numerical data is presented herein and used for convenience and brevity, and thus, should be interpreted in a flexible manner to include not only the numerical values explicitly recited as the only workable parameters, but also to include all the individual numerical values that can be employed in a studio arrangement 100 to achieve the desired effect discussed herein. To illustrate, a distance expressed as "twelve feet" or "eleven inches" should be interpreted to distances that are within a reasonable range of such a distance or may vary significantly provided other parameters compensate to achieve desired effects. Additionally, it should also be understood that embodiments of the disclosure can also include equivalent arrangements of elements in a studio that can also achieve a desired effect. For example, while a particular non-limiting example of parameters related to studio lighting may be recited, these parameters can be varied to achieve the desired effect by modulating a distance in combination with the wattage and/or color temperature of the studio lighting to achieve an equivalent result. All such variations are intended to be within the scope of the present disclosure. In embodiments of the disclosure, terms such as "about," "approximately," and "substantially" can include traditional rounding according to significant figures of the numerical value.

It should be also noted that numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a distance range of "one feet to two feet" should be interpreted to include not only the explicitly recited range, but also include individual distances (e.g., 1.2 feet, 1.3 feet, etc.) and sub-ranges within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A studio arrangement, comprising:
   a background comprising a reflective fabric, the reflective fabric configured to reflect light shined upon the reflective fabric;
   an elevated platform positioned adjacent to the background, the elevated platform having a top surface that is transparent and a rear panel that is substantially white, wherein the reflective fabric is positioned on the background adjacent to the elevated platform to form a vertical gap between the elevated platform and the reflective fabric;
   an image capture position located a first distance away from the background in a longitudinal axis, the image capture position comprising at least one image capture device aimed at the elevated platform and the background, the at least one image capture device equipped with a ring flash positioned around at least one lens of the at least one image capture device;
   a key light aimed at the elevated platform and the background, wherein the key light is positioned outside of the longitudinal axis; and
   a rear light source positioned between the rear panel of the elevated platform and the background.

2. The studio arrangement of claim 1, wherein the elevated platform is approximately four feet deep, four feet wide and eleven inches in height and the gap between the elevated platform and the reflective fabric is approximately three inches.

3. The studio arrangement of claim 1, wherein the rear light source is affixed to the rear panel of the elevated platform.

4. The studio arrangement of claim 1, wherein the rear panel further comprises a white panel positioned between the rear light source and a transparent panel.

5. A studio arrangement, comprising:
- a background comprising a reflective material;
- an elevated platform positioned adjacent to the background, wherein the reflective material is positioned to form a gap between the elevated platform and the reflective material;
- an image capture position located in a longitudinal axis intersecting the background and the elevated platform, the image capture position comprising an image capture device equipped with a ring flash;
- a key light aimed at the elevated platform and the background; and
- a rear light source positioned on an opposing side of the elevated platform relative to the image capture position.

6. The studio arrangement of claim 5, wherein the gap between the elevated platform and the reflective material is approximately three inches.

7. The studio arrangement of claim 5, wherein a top surface of the elevated platform comprises a transparent surface.

8. The studio arrangement of claim 5, wherein the opposing side of the elevated platform comprises a white surface positioned between a transparent panel and the rear light source.

9. The studio arrangement of claim 7, wherein the top surface of the elevated platform further comprises a Poly (methyl methacrylate) surface.

10. The studio arrangement of claim 5, wherein the elevated platform is approximately four feet deep, four feet wide and eleven inches in height.

11. The studio arrangement of claim 5, wherein the key light is positioned outside of the longitudinal axis.

12. The studio arrangement of claim 5, wherein the image capture device is configured with an aperture setting of f/11.

13. The studio arrangement of claim 5, wherein the image capture device is configured with a shutter speed of 160th of a second.

14. The studio arrangement of claim 5, wherein the image capture device is configured with a sensitivity of ISO 500.

15. The studio arrangement of claim 5, wherein the key light is configured with an intensity such that a light meter calculates an aperture setting of f/13, wherein inputs to the light meter are an ISO sensitivity of 500 and a shutter speed of 160th of a second.

16. The studio arrangement of claim 5, wherein the rear light source is configured with an intensity and direction such that a light meter calculates an aperture setting of f/13, wherein inputs to the light meter are an ISO sensitivity of 500 and a shutter speed of 160th of a second.

17. A method, comprising:
- adjusting a ring flash associated with an image capture device based upon a particular sensitivity setting and a particular exposure setting of the image capture device, wherein the image capture device is aimed at a background including a reflective material and an elevated platform positioned between the image capture device and the background;
- adjusting a key light based upon the particular sensitivity and the particular exposure setting, the key light aimed at the elevated platform and the background;
- adjusting a rear light source positioned on a rear surface of the elevated platform based upon the particular sensitivity and the particular exposure setting;
- activating the ring flash, the key light and the rear light source; and
- initiating image capture in the image capture device, wherein a top surface of the elevated platform reflects light emanating from the background such the elevated platform appears a substantially similar color as the background.

18. The method of claim 17, wherein the ring flash, key light and rear light source are configured with a light meter, wherein inputs to the light meter comprise the particular sensitivity and the particular exposure setting.

19. The method of claim 17, wherein the ring flash is adjusted with the key light and the rear light source deactivated, the key light is adjusted with the rear light source and the ring flash deactivated, and the rear light source is adjusted with the key light and the ring flash deactivated.

20. The method of claim 17, wherein the ring flash and key light are adjusted such that a grey card positioned on the elevated platform yields, in an RGB color space, a red color reading, a green color reading and a blue color reading in a range of approximately 183-187.

* * * * *